United States Patent [19]
Yashiki

[11] Patent Number: 5,310,612
[45] Date of Patent: May 10, 1994

[54] IMAGE-HOLDING MEMBER AND PRODUCTION METHOD THEREOF, METHOD FOR FORMING IMAGE-FORMING MASTER USING THE IMAGE-HOLDING MEMBER AND THE FORMING APPARATUS, AND IMAGE-FORMING METHOD USING THEM

[75] Inventor: Yuichi Yashiki, Minami-ashigara, Japan

[73] Assignee: Fuji Xerox Co., Ltd., Tokyo, Japan

[21] Appl. No.: 848,276

[22] Filed: Mar. 9, 1992

[30] Foreign Application Priority Data

| Mar. 11, 1991 | [JP] | Japan | 3-069442 |
| Mar. 11, 1991 | [JP] | Japan | 3-069443 |
| Mar. 28, 1991 | [JP] | Japan | 3-087387 |
| Jul. 4, 1991 | [JP] | Japan | 3-190675 |

[51] Int. Cl.$^5$ ............................ G03G 5/047
[52] U.S. Cl. ........................ 430/58; 430/59; 430/66; 430/41
[58] Field of Search .......... 430/41, 58, 59, 64, 430/65, 66

[56] References Cited

U.S. PATENT DOCUMENTS

| 4,382,118 | 5/1983 | Oka | 430/66 X |
| 4,426,435 | 1/1984 | Oka | 430/66 X |
| 4,515,882 | 5/1985 | Mammino et al. | 430/66 X |
| 4,536,458 | 8/1985 | Ng | 430/41 |
| 4,883,731 | 11/1989 | Tam et al. | 430/41 |
| 4,906,545 | 3/1990 | Fukagai et al. | 430/65 X |
| 4,948,690 | 8/1990 | Hisamura et al. | 430/64 X |
| 5,190,837 | 3/1993 | Sakai et al. | 430/58 |

FOREIGN PATENT DOCUMENTS

| 52-7242 | 1/1977 | Japan . |
| 53-102037 | 9/1978 | Japan . |
| 56-21129 | 2/1981 | Japan . |
| 121044 | 7/1983 | Japan | 430/66 |
| 223445 | 12/1984 | Japan | 430/66 |
| 1-281475 | 11/1989 | Japan . |
| 2-269357 | 11/1990 | Japan . |
| 39965 | 2/1991 | Japan | 430/58 |

Primary Examiner—Roland Martin
Attorney, Agent, or Firm—Oliff & Berridge

[57] ABSTRACT

An image holding member is disclosed, which comprises a substrate having an electrically conductive surface, a charge generating layer formed on said electrically conductive substrate, and a heat softening layer formed on said charge generating layer and containing a charge transporting material, electrically conductive particles, and a heat softening resin, said electrically conductive particles existing in the inside of the heat softening layer and in the vicinity of the surface thereof. The image holding member is capable of writing with laser light having a wavelength of 780 nm and is capable of copying many copies with one image exposure A method of producing the image-holding member, a method and an apparatus for forming an image-forming master using the image-holding member, and an image-forming method by the image-forming master using the image-holding member are also disclosed.

6 Claims, 12 Drawing Sheets

IMAGE-HOLDING MEMBER AND PRODUCTION METHOD THEREOF, METHOD FOR FORMING IMAGE-FORMING MASTER USING THE IMAGE-HOLDING MEMBER AND THE FORMING APPARATUS, AND IMAGE-FORMING METHOD USING THEM

FIELD OF THE INVENTION

The present invention relates to an image-holding member of storing an image information by the transfer of particles in a heat-softening resin and a method of producing the image-holding member. Furthermore, the present invention relates to a method and an apparatus for forming an image-forming master using the image-holding member. Still further, the present invention relates to an image-forming method by the image-forming master using the foregoing image-holding member.

BACKGROUND OF THE INVENTION

For a conventional electrophotographic copying method, a Carlson system wherein after uniformly electrostatically charging the surface of an electrophotographic photoreceptor, an imagewise exposure is applied to the surface to imagewise decay the surface potential, then the surface is developed by a toner, and the toner image formed is transferred onto a plain paper has been widely used as a general method. However, in the system, each one copying of an image requires each image exposure, whereby there is a problem that for high-speed copying, the apparatus is complicated and large-sized.

For solving the problem, a system of obtaining a large number of copies with one image exposure by storing an image information in an electrophotographic photoreceptor has been proposed. For example, JP-A-53-102037 and JP-A-2-269357 (the term "JP-A" as used herein means an "unexamined published Japanese patent application") describe that a durable photoreceptor is obtained by incorporating a specific compound in the photosensitive layer. However, by the aforesaid method, a satisfactory photoreceptor is hard to obtain in the points of the storable time of image information, the contrast at copying, etc.

On the other hand, U.S. Pat. No. 4,883,731 describes an electrophotographic system of obtaining a large number of copies by migrating photosensitive particles in the inside of a heat softening layer to store an image information.

FIG. 9 to FIG. 16 of the accompanied drawings are schematic views explaining the foregoing case. In these FIGURES, a photosensitive master plate 80 is composed of a substrate 81, an electrically conductive layer 82, a heat softening layer 83 containing a heat-softenable thermoplastic resin and a charge transporting material, and photosensitive particles 84 embedded in the heat softening layer near the surface thereof and generating charges by light exposure.

At the use of the photosensitive master plate, as shown in FIG. 9, the surface thereof is first uniformly charged negatively by means of a corona charging device 60. Then, as shown in FIG. 10, an image exposure is applied by an imagewise light energy 61, whereby the photosensitive particles in the exposed portions generate positive and negative charges, the positive charge is transported to the surface of the layer to neutralize the surface charge and, at the same time, the negative charge remains in the particles. Then, as shown in FIG. 11, when the surface of the master plate is heated by heat energy 62, the charged particles in the photosensitive particles migrate in the softened layer by the electrostatic attraction. That is, by heating, an image holding member 90 of the state having the portions containing particles 842 migrated according to the image by heating and the portions containing particles 841 held in situ without migrating is formed.

For carrying out copying using the image holding member 90 in such a state, as shown in FIG. 12, the surface of the image holding member is uniformly charged positively by mean of a corona charging device 71. Then, as shown in FIG. 13, the whole surface is uniformly exposed to light 72, whereby the photosensitive particles generate charges but in this case, since the portions having the particles 841 existing in the original position are different from the portions having the migrated particles 842 in potential decaying characteristics, in other words, since the portions having the particles 841 have a higher sensitivity and decay faster than the portions having the migrated particles 842, there occurs a difference in surface potential between both the portions and an electrostatic latent image of a high electric potential is formed at the portions having the migrated particles 842.

Then, as shown in FIG. 14, the electrostatic latent image is developed with toner particles 91 and further as shown in FIG. 15, the toner image is transferred to a receiving paper 92 using a transfer charging device 93 to form a toner image on the paper 92. Thereafter, as shown in FIG. 16, by strongly applying thereto static eliminating light 94, the potential at the portions having the migrated particles 842 is decayed and the holding member returns to the original state.

By repeating the aforesaid steps of from FIG. 12 to FIG. 16 for the image holding member, the copying operations for obtaining many copies can be carried out by charging and the overall exposure only without need of an additional image exposure step. In this case, since the image holding member used becomes unnecessary after finishing the copying operation, a new photosensitive master plate 80 is prepared again.

Also, in the case of negatively charging the image holding member at uniformly charging it in FIG. 12, when an overall exposure 72 is applied onto the surface, the surface charge at the portions having the particles 842 is decayed and the portions having the particles 841 are developed to give a reversed toner image to the case shown in FIG. 14.

The electrophotographic method using the photosensitive master plate described above is a very preferred method in the case of copying many copies by one image exposure. However, since selenium is used as the photosensitive particles, there is a disadvantage that the spectral sensitivity is dominated by selenium.

FIG. 8 is a graph showing the spectral sensitivity characteristics of photosensitive layer, wherein B is the spectral sensitivity curve of a photosensitive layer using selenium.

Recently, with the progress of an electronic technique, a system of operating imagewise modulated laser light with a rotary reflection mirror as a light source of an image exposure has been widely employed and as the laser light source in this case, a laser diode emitting laser light having a wavelength of 780 nm has been generally used. However, as is clear from FIG. 8, since the photosensitive layer using selenium does not have a sensitivity to 780 nm, the foregoing electrophotographic method using selenium as the photosensitive particles has the fault that images cannot be written by such a laser light. Furthermore, in the foregoing electrophotographic system, there is a problem that at copying, the overall exposure as show in FIG. 13 must be repeatedly applied every one copy and hence even though an addition image exposure is unnecessary in the aforesaid electrophotographic system, the simplification of the steps has been desired.

SUMMARY OF THE INVENTION

A first object of the present invention is to provide an image holding member capable of writing with laser light having a wavelength of 780 nm and capable of copying many copies with one image exposure and a method of producing thereof.

A second object of the present invention is to provide a method of forming an image-forming master using the above-described image holding member, a printing method using said image-forming master, and the printing apparatus thereof.

A third object of the present invention is to provide an image-forming method with the image-forming master using the above-described image holding member.

It has now been discovered that the foregoing objects can be achieved by the present invention as described hereinbelow.

That is, according to the first embodiment of the present invention, there is provided an image holding member comprising:
  a substrate having an electrically conductive surface,
  a charge generating layer formed on said electrically conductive substrate, and
  a heat softening layer formed on said charge generating layer and containing a charge transporting material, electrically conductive particles, and a heat softening resin, said electrically conductive particles existing in the inside of the heat softening layer and in the vicinity of the surface thereof.

According to the second embodiment of the present invention, there is provided a method of producing an image holding member comprising the steps of:
  forming a charge generating layer on a substrate having an electrically conductive surface,
  forming a heat softening layer containing a charge transporting material and a heat softening resin on the surface of said charge generating layer, and
  coating a coating composition containing the foregoing heat softening resin and electrically conductive particles on said heat softening layer.

According to the third embodiment of the present invention, there is provided a method of forming an image-forming master comprising the steps of:
  providing an image holding member comprising a substrate having an electrically conductive surface, a charge generating layer formed on said electrically conductive substrate, and a heat softening layer formed on said charge generating layer and containing a charge transporting material, electrically conductive particles, and a heat softening resin, said electrically conductive particles existing in the inside of said heat softening layer and in the vicinity of the surface thereof,
  applying uniform negative charging onto said image holding member,
  applying an image exposure onto said image holding member, and
  heating said heat softening layer to a temperature of at least the softening point of said heat softening resin.

According to the fourth embodiment of the present invention, there is provided an apparatus for forming an image-forming master comprising:
  a first charging means for uniformly charging an image holding member comprising a substrate having an electrically conductive surface, a charge generating layer formed on said electrically conductive substrate, and a heat softening layer formed on said charge generating layer and containing a charge transporting material, electrically conductive particles, and a heat softening resin, said electrically conductive particles existing in the inside of said heat softening layer and in the vicinity of the surface thereof,
  an exposure means for image-exposing said image holding member, and
  a heating means for heating said image holding member to a temperature of at least the softening point of said heat softening resin.

According to the fifth embodiment of the present invention, there is provided an image-forming method comprising the steps of:
  providing an image holding member comprising a substrate having an electrically conductive surface, a charge generating layer formed on said electrically conductive substrate, and a heat softening layer formed on said charge generating layer and containing a charge transporting material, electrically conductive particles, and a heat softening resin, said electrically conductive particles existing in the inside of the heat softening layer and in the vicinity of the surface thereof,
  applying uniform negative charging onto said image holding member,
  applying an image-exposure onto said image holding member,
  heating said heat softening layer to a temperature of at least the softening point of said heat softening resin,
  applying uniform charging onto said image holding member, and
  bringing developing particles into contact with said image holding member.

DETAILED DESCRIPTION OF THE INVENTION

Then, the invention is explained in detail.

Figure 1:
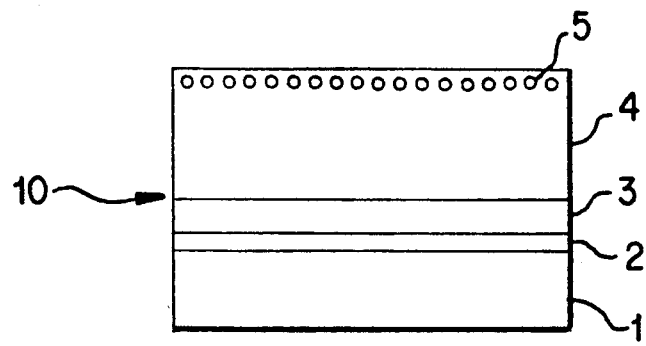
FIG. 1 is a schematic cross-sectional view of one embodiment of the image holding member of the present invention.

FIG. 1 is a schematic cross-sectional view of one embodiment of the image holding member of the present invention. As shown in FIG. 1, an image holding member 10 comprises a substrate 1, an electrically conductive layer 2 formed thereon, a charge generating layer 3 formed thereon, further a heat softening layer 4 composed of a charge transporting material and a heat softening resin which is softened by heat formed on the charge generating layer 3, and electrically conductive particles 5 embedded in the vicinity of the surface of the heat softening layer 4 to form a conductive particle layer.

In the image holding member of the present invention, as the substrate, any substrates which can be used for electrophotographic photoreceptors, such as, for example, a plastic film, a paper, a metal foil, and a glass sheet can be used. Also, there is no particular restriction on the form thereof and a substrate having an optional form can be used.

The substrate must have at least an electrically conductive surface. The conductive surface may be formed by forming an electrically conductive layer. As the electrically conductive layer, a conductive layer through which an electric charge can freely pass can be used. For example, a metal layer may be formed by a method such as a vapor deposition method, a sputtering method, a plasma CVD method, a plating method, etc., or an electrically conductive coating composition prepared by dispersing particles of an electrically conductive material such as a metal, a metal oxide having a low electric resistance, etc., in a resin may be coated on the substrate. Also, when the substrate itself is electrically conductive, it is unnecessary to form an electrically conductive layer.

On the electrically conductive surface or layer may be formed a reflection preventing functional region such as a subbing layer for improving an adhesive property, improving an antistatic property, and improving the image quality.

The subbing layer can be formed by coating a coating composition for subbing layer and examples of a resin which is used for the coating composition are polyvinyl alcohol, polyvinyl pyrrolidone, polyvinyl pyridine, cellulose esters, polyamide, polyurethane, casein, polyglutamic acid, starch, starch acetate, amino starch, polyacrylic acid, and polyacrylamide. In these materials, type 8-nylon described in JP-A-56-21129 and the polyamide series resins such as copolymerized nylon described in JP-A-52-7242 are preferred in the points of an adhesion with a metal, the solvent resistance to a solvent of a coating composition for a charge generating layer formed thereon, and the stability of the coating composition for subbing layer.

The subbing layer may be formed by the foregoing resin alone but it is preferred to disperse therein a powder for scattering a coherent light such as a laser light to prevent the occurrence of an interference fringe. As the powder, there are a powder of an organic material such as polyethylene, polypropylene, polyvinyl chloride, polyvinylidene fluoride, polyester, polystyrene, Teflon (trade name, made by E.I. Du Pont de Nemours & Co., Ltd.), a silicone resin, etc., and a powder of an inorganic material such as titanium oxide, zinc oxide, silica, alumina, barium sulfate, calcium sulfate, kaolin, calcium silicate, calcium carbonate, white lead, magnesium carbonate, lithopone, magnesium oxide, zirconium oxide, cerium oxide, etc.

They can be used singly or as a mixture thereof. In addition, electrically conductive particles which will be described below have a charge injecting property and hence the use of such conductive particles for the aforesaid purpose is undesirable.

The coating composition for subbing layer may further contain an electrically conductive polymer, an electron donating or accepting material, a carboxylic acid compound, a sulfonic acid compound, a quaternary ammonium salt, etc., in addition to the foregoing components for lowering the resistibility. Furthermore, the coating composition may contain various kinds of surface active agents, silane, or a titanate coupling agent for improving the dispersibility of the powder.

For dispersing the aforesaid components, an ordinary method can be used. For example, these components can be dispersed by a ball mill, a sand mill, or a roll mill.

The coating composition for subbing layer is coated at a layer thickness of from 0.5 $\mu$m to 5 $\mu$m. If the thickness of the subbing layer is too thick, it undesirably causes the accumulation of residual charges.

When a powder is dispersed in the coating composition for subbing layer, the surface of the subbing layer formed becomes rough. The roughness is preferably from 0.1 $\mu$m to 0.5 $\mu$m as Ra and from about 0.3 $\mu$m to 1 $\mu$m as Rmax. A too large roughness causes a trouble that the image quality becomes rough, etc.

In addition, even in the case of the image holding member having no such a subbing layer, as disclosed in JP-A-1-281475, an interference fringe does not occur when a coherent light enters at a curvature of not larger than 20 mm in curvature radius but by forming the subbing layer, an interference fringe is reluctant to occur even in the case of using in a state that the coherent light enters at a curvature of larger than 20 mm.

For the charge generating layer being used in the present invention, the same materials as those for forming charge generating layers being used in ordinary function separation type electrophotographic photoreceptors can be used. That is, as a material for the charge generating layer in this invention, phthalocyanine pigments such as metal phthalocyanines, metal-free phthalocyanines, etc.; squarylium compounds; azulenium compounds; polycyclic quinones such as perylene pigments, indigo pigments, quinacridone pigments, anthanthrone, brominated anthanthrone, pyranthrone, flavanthrone, etc.; cyanine dyes; xanthene dyes; charge transporting complexes composed of poly-N-vinylcarbazole and trinitrofluorenone, etc.; eutectic crystal complexes composed of pyrylium dyes and polycarbonate resins, etc., can be used and also high-sensitive materials such as titanyl phthalocyanines having various crystal structures, azo pigments, etc., can be used.

The charge generating material can be used, if necessary, together with a charge transporting material.

The charge generating layer is formed by preparing a coating composition for charge generating layer by dispersing the foregoing materials and a suitable binder resin in a solvent by an ordinary method and coating the coating composition on the electrically conductive layer or the subbing layer followed by drying to remove the solvent. As the coating method, an optimum method may be selected according to the form of the substrate and a dip coating method, a spin coating method, a spray coating method, an atomizer, a roll coating method, a bar coating method, a die coating method, etc., may be used.

The layer thickness of the charge generating layer is usually selected in the range of from 0.1 $\mu$m to 2 $\mu$m.

Then, a heat softening layer is formed on the charge generating layer. The heat softening layer can be formed by coating a coating composition containing a charge transporting material and a heat softening resin.

As the charge transporting material, any materials which can be used for a charge transporting layer of an electrophotographic photoreceptor can be used. For example, there are polycyclic aromatic compounds such as anthracene, pyrene, phenanthrene, etc.; compounds having a nitrogen-containing heterocyclic ring, such as indole, carbazole, imidazole, etc.; pyrazoline compounds; hydrazone compounds; triphenylmethane compounds; triphenylamine compounds; stilbene compounds; and benzidine compounds.

Also, as the heat softening resin, thermoplastic resins having a glass transition point (Tg) of from 30° C. to 90° C. and a viscosity at a temperature of at least Tg of from $10^2$ to $10^6$ poises can be preferably used. Examples of the heat softening resin are polyethylene, vinyl chloride resins, polypropylene, styrene resins, ABS resins, polyvinyl alcohol, acrylic resins, acrylonitrile-styrene resins, vinylidene chloride resins, AAS (ASA) resins, AES resins, cellulose derivative resins, thermoplastic polyurethane, polyvinyl butyral, poly-4-methylpentene-1, polybutene-1, and rosin ester resins. And in these resins, a styrene-acrylic acid ester copolymer and a styrene-acrylic acid ester-acrylic acid terpolymer are particularly preferred.

A coating composition prepared by dissolving the foregoing components in a proper solvent is usually coated at a layer thickness of from 3 $\mu$m to 15 $\mu$m. As the coating method, the coating method same as those described above for the charge generating layer can be used but since the thickness of the heat softening layer is thicker than that of the charge generating layer, the coating condition can be properly changed or other coating method than the case of coating the charge generating layer can be used.

In the present invention, an electrically conductive particle dispersion containing electrically conductive particles is coated on the heat softening layer to form a layer containing the electrically conductive particles in the vicinity of the surface of the heat softening layer and in the range within the distance of few times the diameter of the conductive particles from the surface of the image holding member.

In the present invention, the "vicinity of the surface of the heat softening layer" means the region within 2 $\mu$m, preferably the region within 1 $\mu$m, of the surface of the heat softening layer.

The sizes of the electrically conductive particles being used in the present invention are generally in the range of from 0.01 $\mu$m to 2 $\mu$m, and preferably in the range of from 0.05 $\mu$m to 1 $\mu$m. If the sizes of the conductive particles are too large, the conductive particles are reluctant to migrate and if the sizes are too small, the particles are undesirably reluctant to be charged. Also, the case that the heat softening layer containing the conductive particles is a thin layer of less than 3 $\mu$m thickness is undesirable since the migration of the particles becomes difficult. Further, the electrically conductive particles have the volume resistivity of $10^8$ $\Omega$·cm or less, preferably $10^0$–$10^8$ $\Omega$·cm, and more preferably $10^1$–$10^6$ $\Omega$·cm.

As an electrically conductive material constituting the electrically conductive particles for use in the present invention, carbon black, copper iodide, silver iodide, zinc sulfide, silicon carbide, etc., as well as metal oxides are preferably used. In particular, metal oxides containing an oxygen defect and materials containing a small amount of a foreign atom forming a donor to the metal oxide being used are preferable since the electric conductivity thereof is high, that is, they contain a large amount of electron positive hole pairs. Examples of the metal oxide are $TiO/TiO_2$, $SnO_2$, $In_2O_3$, $MoO_3$, etc., and the composite oxides thereof and examples of the metal oxide containing a foreign atom are ZnO containing Al or In, $TiO/TiO_2$ containing Nb, Ta, etc., and $SnO_2$ containing Sb, Nb, a halogen atom, etc. The content of the foreign atom is in the range of preferably from 0.01 to 30 mol %, and particularly preferably from 0.1 to 10 mol%. Further, it is preferred that the electrically conductive particles for use in the present invention substantially do not have photoconductive properties.

If the foregoing electrically conductive particles are only attached to the surface of the heat softening layer, the migration of the particles does not occur and hence in the present invention, it is necessary that the conductive particles are in a state of being embedded from the surface of the heat softening layer. For the purpose, (1) a method of using a dispersion containing the same heat softening resin as the resin constituting the heat softening layer together with the electrically conductive particles as the electrically conductive particle dispersion and forming a layer having the electrically conductive particles dispersed in the heat softening resin on the surface of the heat softening layer by coating the dispersion, and (2) a method of using a dispersion having the electrically conductive particles dispersed in a solvent having a property of dissolving the heat softening layer as the electrically conductive dispersion and dissolving the surface of the heat softening layer at coating the dispersion to embed the conductive particles in the surface of the heat softening layer can be employed.

As the solvents having a property of dissolving the heat softening layer, there can be cited toluene, xylene, monochlorobenzene, tetrahydrofuran, dioxane, dichloromethane, chloroform, etc.

In addition, in the present invention, it is preferred that the electrically conductive particle dispersion contains a charge transporting material. Also, for improving the dispersibility of the electrically conductive particles, the conductive particle dispersion may contain a treating agent such as a surface active agent, a silane coupling agent, a titanate coupling agent, etc.

In addition, for forming the electrically conductive particle layer by embedding the electrically conductive particles in the vicinity of the surface of the heat softening layer, a dry process, such as a vapor deposition method (resistance heating or electron beam heating), an ion plating method, a glow discharging sputtering method, an ion beam sputtering method, etc., can be utilized.

In the case of a vapor deposition method, the heat softening layer is in a softened state by heating and an electrically conductive material may be vapor deposited thereon at a low pressure of from 10 to $10^{-3}$ Torr, whereby the conductive material is aggregated at the surface of the heat softening layer to form a fine particle state and the particles are embedded in the vicinity of the surface of the heat softening layer in a state of a single layer form or in an arranged state of plural layers.

Also, a glow discharging sputtering method which is known to be a method of forming a transparent electrically conductive layer on a plastic film such as a polyester film can be used as it is for making the image holding member of the present invention. In this case, by previously heating the heat softening resin, an electrically conductive material used becomes a fine particle form to form an electrically conductive particle layer in the vicinity of the surface of the heat softening layer.

As another method of forming the electrically conductive particle layer in the vicinity of the surface of the heat softening layer a wet method wherein electrically conductive particles are dispersed in a coating composition having the same composition as the coating composition for forming the heat softening layer and the dispersion is coated on the heat softening layer can be employed. In this case, it is necessary to quickly dry the coated layer of the dispersion at the case of coating the dispersion on the heat softening layer such that the heat softening layer is not dissolved with the solvent in the dispersion.

Figure 26:
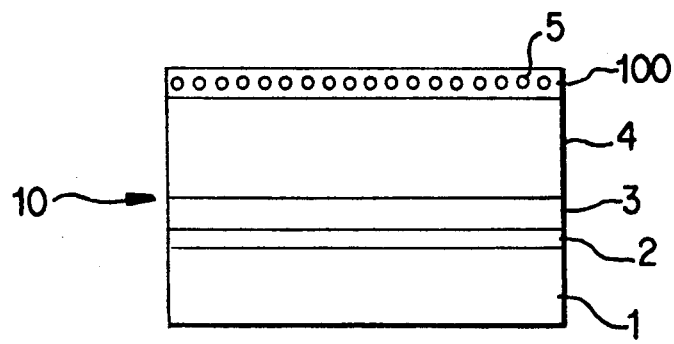
FIG. 26 is a schematic cross-sectional view of the image holding member prepared in an example of the present invention.
Figure 27:
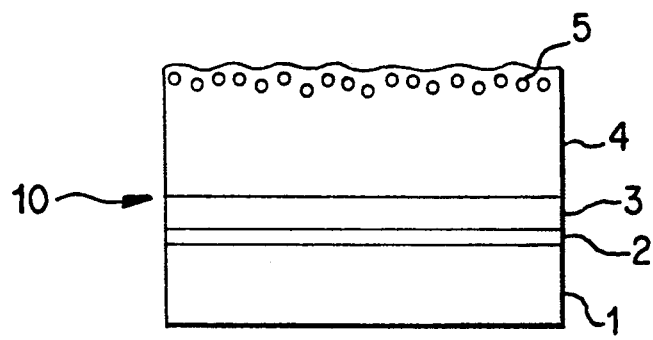
FIG. 27 is a schematic cross-sectional view of the image holding member prepared by other example of the present invention.

FIG. 26 shows the image holding member prepared by the foregoing method (1) and FIG. 27 shows the image holding member prepared by the foregoing method (2).

In the image holding member shown by FIG. 26, an electrically conductive layer 2 is formed on a substrate 1 and on the conductive layer are also formed a charge generating layer 3 and a heat softening layer composed of a charge transporting material and a heat softening resin which is softened by heat. Furthermore, an electrically conductive particle dispersion containing electrically conductive particles 5, a heat softening resin, and, if desired, a charge transporting material is coated on the heat softening layer to form an electrically conductive particle dispersion layer 100. The layer thickness of the conductive particle dispersion layer 100 is preferably from about twice to about 5 times the particle size of the electrically conductive particles and also the ratio of the conductive particles in the layer is preferably from about 2 to 20% by volume ratio. If the content of the conductive particles is too large, the particles are brought into contact with each other to reduce the surface electric resistance, which results in causing a trouble for the formation of images.

In the aforesaid case, it is preferred that as the heat softening resin in the electrically conductive particle dispersion, the same kind of the resin as the heat softening resin of the heat softening layer 5 is used since a boundary between the heat softening layer and the electrically conductive particle dispersion layer is not formed after evaporating the solvent.

The solvent being used for the conductive particle dispersion may have a property of dissolving the heat softening layer or may not have such a property, and in the case of using the solvent having a property of dissolving the heat softening layer, it is necessary to take care not to excessively proceed the dissolution of the heat softening layer.

In the image holding member shown in FIG. 27, an electrically conductive particle dispersion prepared by dispersing electrically conductive particles 5 in a solvent having a property of dissolving the heat softening layer is coated on a heat softening layer 4 to form a layer containing electrically conductive particles 5. In this case, since the surface of the heat softening layer is dissolved with the solvent, the electrically conductive particles 5 are embedded in the vicinity of the heat softening layer to form the layer containing the conductive particles. In this case, if the amount of the solvent is too much or if drying of the solvent is delayed, the dissolution of the heat softening layer proceeds too much, whereby the electrically conductive particles migrate deeply in the inside of the heat softening layer, which is undesirable. Accordingly, drying after coating the conductive particle dispersion is carried out carefully and it is preferable to control to dry by air-drying (set to touch) for from about 3 seconds to 10 seconds.

The conductive particle-containing heat softening layer as shown in FIG. 27 of the present invention has a layer thickness of from 1 $\mu$m to 30 $\mu$m, preferably from 3 $\mu$m to 15 $\mu$m.

In the case of the aforesaid method (2), as schematically shown in FIG. 27, the surface of the image holding member may, sometimes, be roughened to some extent but such a roughness gives no particular problem. In addition, it is necessary that the coating amount of the electrically conductive particles is adjusted such that the conductive particles are not brought into contact with each other.

In a preferred embodiment of the present invention, a particle layer formed by embedding electrically conductive particles and insulating particles is formed in the vicinity of the surface of the heat softening layer.

The foregoing preferred embodiment of the present invention is explained in more detail by referring to the accompanying drawings.

Figure 22:
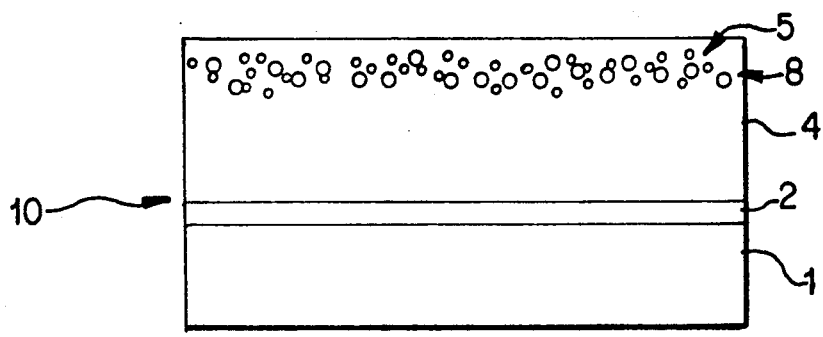
FIG. 22 is a schematic cross-sectional view of one embodiment of the image holding member of the present invention containing a mixture of electrically conductive particles and insulating particles.

FIG. 22 is a schematic cross-sectional view of the image holding member in the preferred embodiment of the present invention and in the case shown by FIG. 22, the image holding member 10 does not need a charge generating layer. That is, in the image holding member, an electrically conductive layer 2 (such a layer is unnecessary when a substrate is electrically conductive) and a heat softening layer 4 are formed on a substrate 1. In the surface of the heat softening layer are embedded electrically conductive particles 5 and insulating particles 8.

As a method of embedding such two kinds of particles, a method of coating a coating composition containing the two kinds of particles on the surface of the heat softening layer is most suitable.

In this case, the electrically conductive particles are same as those described above. The particle sizes of the conductive particles are selected in the range of from about 0.01 $\mu$m to 2 $\mu$m.

As the insulating particles, various kinds of powders for coating compositions can be widely used. As such a powder, there are organic powders of polyethylene, polypropylene, polyvinyl chloride, polyvinylidene fluoride polyvinylidene chloride, polyester, polystyrene, Teflon, a silicone resin, etc., and inorganic powders of titanium oxide ($TiO_2$), zinc oxide (ZnO), silica, alumina, barium sulfate, calcium sulfate, kaolin, calcium silicate, calcium carbonate, white lead, magnesium carbonate, lithopone, magnesium oxide, zirconium oxide, cerium oxide, etc.

These powders can be used singly or as a mixture of them. The particle sizes thereof are preferably from 0.2 $\mu$m to 0.4 $\mu$m. Further, the insulating particles have the volume resistivity of more than $10^8$ $\Omega$·cm and the upper limit being $10^{15}$ $\Omega$·cm, preferably $10^9$–$10^{13}$ $\Omega$·cm. Since there are powders for coating having various particle sizes as commercially available powders, the powders having the foregoing particle sizes can be easily available.

The ratio of the electrically conductive particles to the insulating particles is generally in the range of 1/100 to 100/1 by volume ratio.

By using the insulating particles together with the electrically conductive particles, the amount of the relatively expensive electrically conductive particles can be reduced, thereby the production cost of the image holding member can be reduced.

Also, as the insulating particles, there are various commercially available products and the particles having proper particle sizes can be easily selected.

In the case of preparing the image holding member using a mixture of the electrically conductive particles and the insulating particles, charge is accumulated on the electrically conductive particles at electrostatic charging and the insulating particles are attracted to the conductive particles. Accordingly, when insulating particles having particle sizes of from 0.2 $\mu$m to 0.4 $\mu$m, which are convenient for migration, are selected as the insulating particles, the insulating particles migrate very easily. It has been found that in this case, with the migration of the insulating particles, the electrically conductive particles also migrate by the migrating action of the insulating particles. That is, in the case of mixing both kinds of particles, it has been confirmed that the migrating amount of the particles is larger than the case of using the electrically conductive particles alone and also it has been confirmed that the electrostatic contrast at copying becomes higher.

Figure 28:
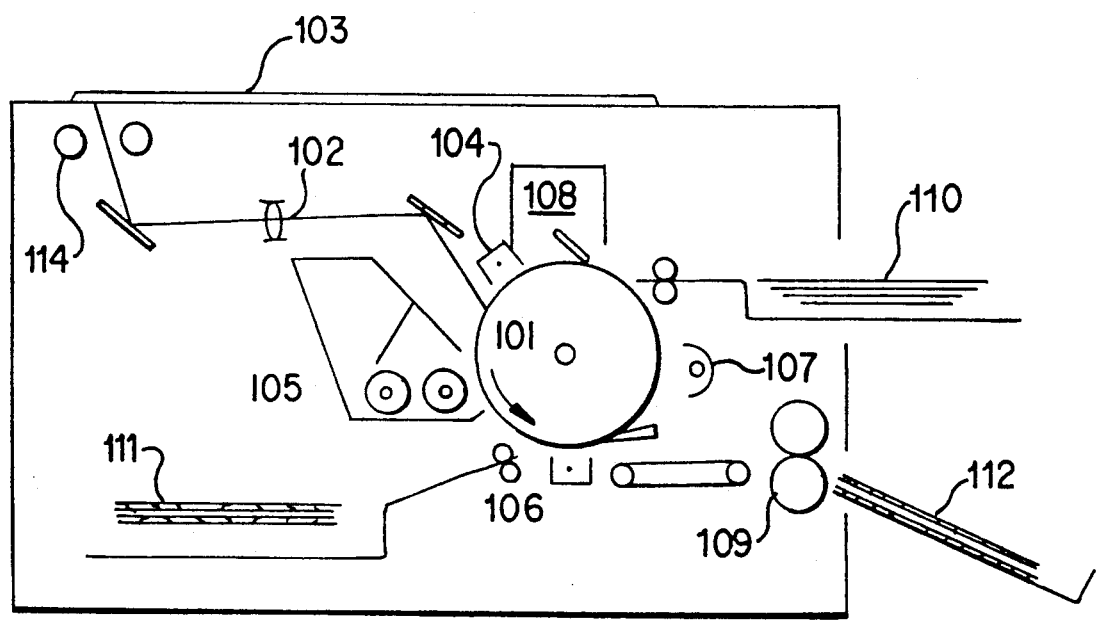
FIG. 28 is a schematic cross-sectional view of one embodiment of the apparatus of the present invention for forming an image-forming master.

Then, a method of forming an image-forming master using the image holding member of the present invention and a printing method and apparatus of using the image-forming master are explained by referring to FIG. 28.

First, for forming an image-forming master, an image holding member 110 is wound round a rotator 101 and supported and thereafter the image holding member 110 is uniformly charged negatively with an electrostatic charging device 104. Then, the image holding member 110 is image-exposed by irradiating the image holding member with light which is reflected from an original 103 irradiated by an exposure lamp 114 and passed through a projection lens 102. After the image exposure, the image holding member 110 is heated to a temperature of at least the softening point of the heat softening resin with an infrared lamp 107 and then cooled to provide an image-forming master. The aforesaid image-forming process is as shown in FIG. 1 to FIG. 4 described hereinbefore.

Then, a printing method using the aforesaid image-forming master as a block copy is explained.

Figure 5:
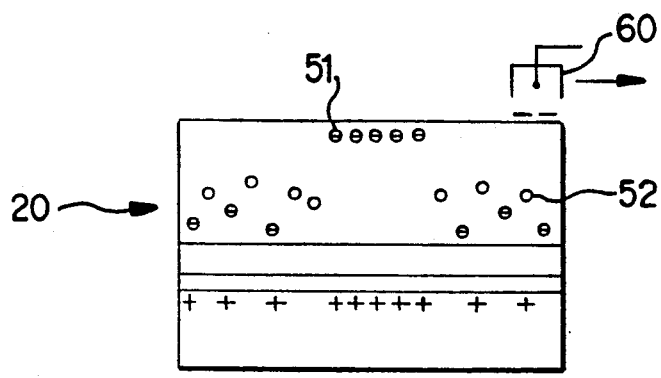
FIG. 5 is a view showing an electrophotographic method using the image holding member of the present invention.

As described above, the image-forming master wound round the rotator 101 is obtained. At printing, the image-forming master is negatively charged again with the electrostatic charging device 104 to form an electrostatic latent image pattern as shown in FIG. 5 described hereinbefore. The electrostatic latent image pattern formed is equivalent to an electrostatic latent image pattern formed after carrying out electrostatic charging and image exposure using an ordinary electrophotographic photoreceptor.

After forming the electrostatic latent image pattern, the latent image on the image-forming master is brought into contact with developing particles having a definite electrostatic charge with a developing device 105, whereby the developing particles are transferred onto the image holding member 110 in conformity with the definite charge pattern. Thus, the aforesaid electrostatic latent image is visualized by attaching of the developing particles.

Then, the developing particles on the image holding member move to the position of a transfer electrostatic charging device 106 and the image holding member is transported with the rotation of the rotator 101 and is superposed on a transfer paper 111. From the transfer charging device 106, an electrostatic charge of the opposite polarity to the charge of the aforesaid developing particles is applied, whereby the developing particles on the image holding member 110 are transferred to the side of the transfer paper 111. The transfer paper 111 is passed through a fixing device 109, whereby the developing particles on the transfer paper are melted and fixed by heat-pressing to form a final fixed image on the transfer paper.

Thereafter, the developing particles remaining on the image holding member 110 without being transferred to the transfer paper are removed by a cleaning device 108 and the image holding member 110 having the surface thus refreshed is applied again to the printing steps of charging, developing, transferring, fixing, and cleaning.

By repeatedly applying the printing steps using the aforesaid image-forming master, many prints can be obtained and during printing many prints or copies, the electrostatic latent image pattern on the image-forming master is not lost. The image holding member 110 after finishing the one printing procedure for obtaining many prints is wasted.

The foregoing step of forming the image-forming master and the printing step are carried out in a same apparatus in the above-described example, but they may be practiced by separate apparatus.

Also, the image holding member may be a cut sheet form or may be a roll sheet form, and in the latter case, the roll sheet-form image holding member is placed in a container and the image holding member in a roll sheet form may be supplied onto the rotator 101 at a proper necessary length.

As the electrostatic charging device 104, a corotron is preferably used. As an image exposing means, a light exposure means of an original reflection type composed of a light exposure lamp, a projection lamp, and reflection mirrors or an exposure means using a previously electrically image-modulated light may be used.

Also, as such a light exposure means, a laser exposure means composed of a semiconductor laser, a rotary polyhedric mirror, and an optical system as well as a matrix-type LED light source, a matrix-type fluorescent display tube, a liquid crystal light bulb light source, etc., can be used.

As a means for heating the image holding member to a temperature of at least the softening point of the heat softening resin, the aforesaid infrared fixing device as well as a heat roll-type fixing device, a flash fixing device, etc., can be used. Also, as the developing apparatus 105, a two-component magnetic brush type developing apparatus, a one-component magnetic brush type developing apparatus, a two-component non-contact type developing apparatus, a one-component non-contact type developing apparatus, etc., can be used. The developing particles being used may be magnetic particles or non-magnetic particles.

The two-component magnetic brush type developing apparatus has practically a construction that a magnetic roll is disposed in a non-magnetic developing sleeve, said magnetic roll being rotatable relatively with said sleeve, a two-component developer composed of developing particles called as a toner and magnetic carrier particles for giving a definite charge to the toner is held on said sleeve to form a brush composed of the two-component developer in conformity with the magnetic pattern of said magnetic roll, and while rotating the brush by the relative rotary force between said sleeve and said magnetic roll, the brush is brought into contact with the aforesaid image holding member 110. At development, a development bias voltage can be applied to said sleeve.

As the transfer charging device 106, a corotron can be used and as the cleaning device 108, a cleaning blade, etc., disposed in contact with the image holding member can be used.

As the fixing device 109, a heat-press type fixing device composed of a pair of a heating roll composed of a metallic sleeve having a coating of Teflon, etc., on the surface thereof having a quartz lamp, etc., disposed in said sleeve and a press roll composed of a metal core having an elastic layer such as silicone rubber, etc., formed on the surface thereof, said heat roll and said press roll being in a press-contact state, can be suitably used but a flash fixing device, etc., can be also used.

In the present invention, not only printing of monotone images only but also printing of color images can be possible. For example, four rotators 101 are disposed in parallel, for each rotator, an image-forming master of cyan, magenta, yellow, or black image is formed, each image-forming master is successively developed with cyan, magenta, yellow, and black developing particles using each different developing device, and after matching the position of each toner image and successively transferring each toner image onto a transfer paper, the transferred toner images of four colors are simultaneously fixed, whereby printing of a multicolor image become possible.

Then, an image-forming method by storing an image information in the image holding member prepared as described above is explained by referring to the accompanying drawings. FIG. 2 to FIG. 4 and FIG. 18 to FIG. 20 are views for explaining the image-forming method.

Figure 2:
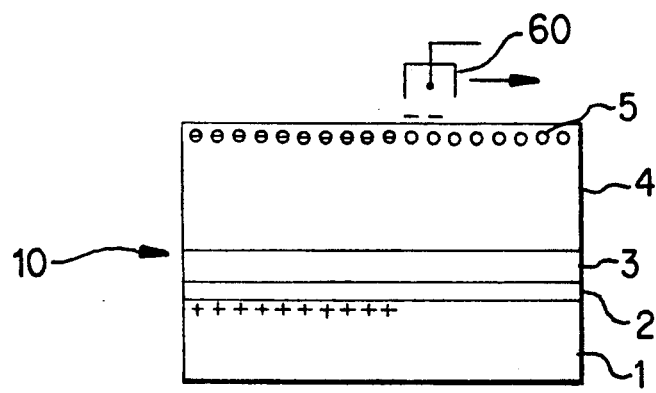
FIG. 2 is a view showing an electrostatic charging step in the image-forming method of the present invention.
Figure 18:
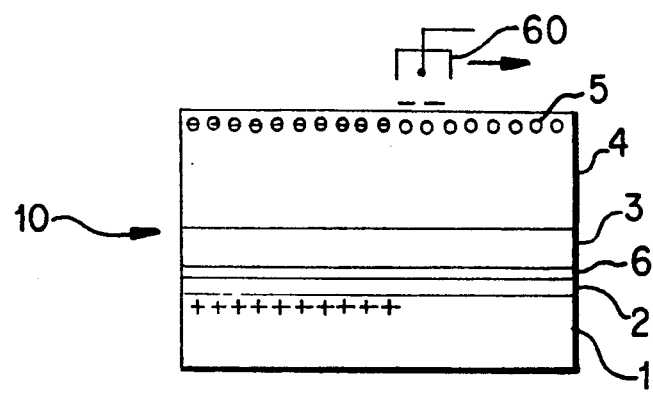
FIG. 18 is a view showing an electrostatic charging step in an image-forming method using the image holding member of the present invention having formed therein a subbing layer.

First, as shown in FIG. 2 and FIG. 18, a corona discharging device 60 is moved relative to an image holding member 10 to apply negative charging to the surface of the image holding member, whereby the foregoing electrically conductive particles having an electron positive hole pair at normal temperature immediately release the positive hole to the negative charge at the surface to neutralize the surface charge through a charge transporting material. Also, in the inside of the conductive particles, a negative charge remains. In addition, when the surface potential is measured in this case, the surface potential is from about 80% to 95% as compared to the case of not existing the electrically conductive particles.

Figure 3:
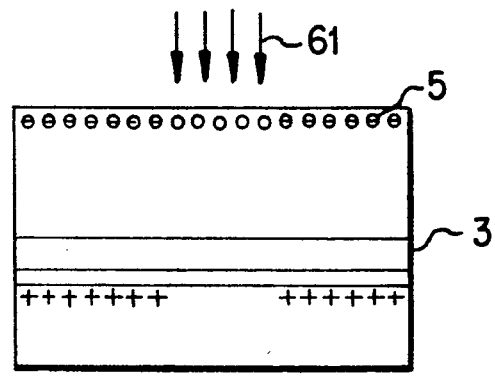
FIG. 3 is a view showing a light exposure step in the image-forming method of the present invention.
Figure 19:
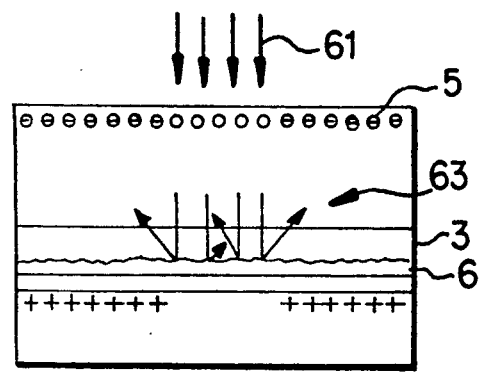
FIG. 19 is a view showing a light exposing step in an image-forming method using the image holding member of the present invention having formed therein a subbing layer.

Then, as shown in FIG. 3 and FIG. 19, an image exposure is applied. The numeral 61 is a light of exposing the charge generating layer and the greater part of the light reaches the charge generating layer through a sufficiently thin electrically conductive particle layer. In the case of a diode laser light, the image holding member is exposed to the light by imagewise modulating the light with an electronic means and in this case, the light may be applied to the portions of attaching a developer, whereby a positive charge is injected from the charge generating layer into the heat softening layer, transported in the layer, and neutralize the negative charge of the electrically conductive particles. On the other hand, in the electrically conductive particles to which the light was not applied, a negative charge remains.

Figure 4:
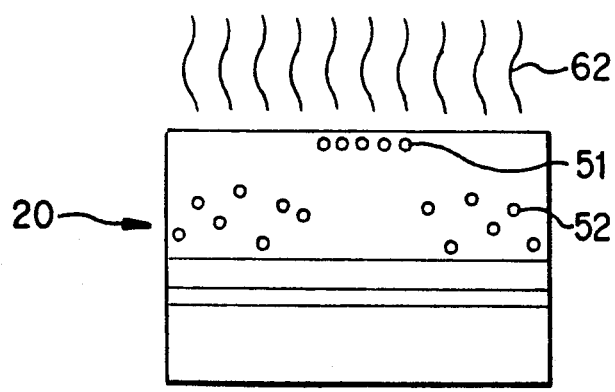
FIG. 4 is a view showing a heating step in the image-forming method of the present invention.
Figure 20:
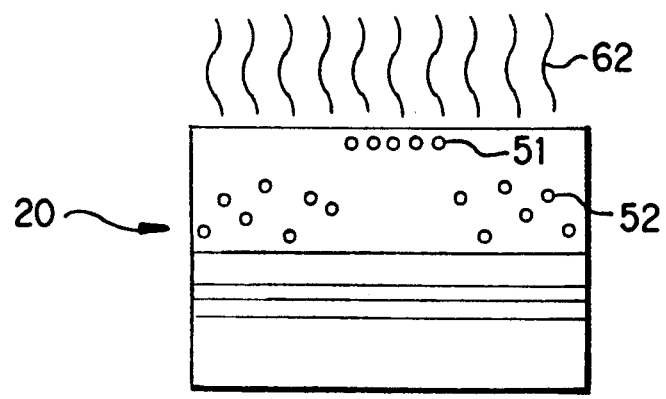
FIG. 20 is a view showing a heating step in an image-forming method using the image holding member of the present invention having formed therein a subbing layer.

Thereafter, as shown in FIG. 4 and FIG. 20, the image holding member is heated by heat 62. As the heating means, a method of passing heating rollers, a method of placing in a heating vessel, a method of heating with a heat radiation, etc., can be employed and the image holding member is heated to a temperature of at least Tg of the heat softening resin for several seconds, whereby the electrically conductive particles having a remaining negative charge migrate in the heat softening layer having reduced viscosity by being softened to the substrate side as an electrode by an electrostatic attraction. On the other hand, since the electric resistance of the heat softening layer is lowered by heating and the charge of the electrically conductive particles rapidly causes spontaneous discharging, the conductive particles do not all migrate to the electrode (substrate) side and stay in the heat softening layer as sparse distributions according to the sizes of the particles, the dispersion of the charge density, etc. Thus, the portions containing the migrated conductive particles (migrated particles 52) are formed.

Then, by allowing to cool the image holding member to normal temperature, the image holding member 20 storing the image information is obtained. In addition, since the portions wherein the electrically conductive particles migrated have a low light transmittance, the difference in density (light and shade) can be visually confirmed.

Then, an image-forming method of storing an image information in the image holding member prepared using a mixture of electrically conductive particles and insulating particles is explained referring to the accompanying drawings.

Figure 23:
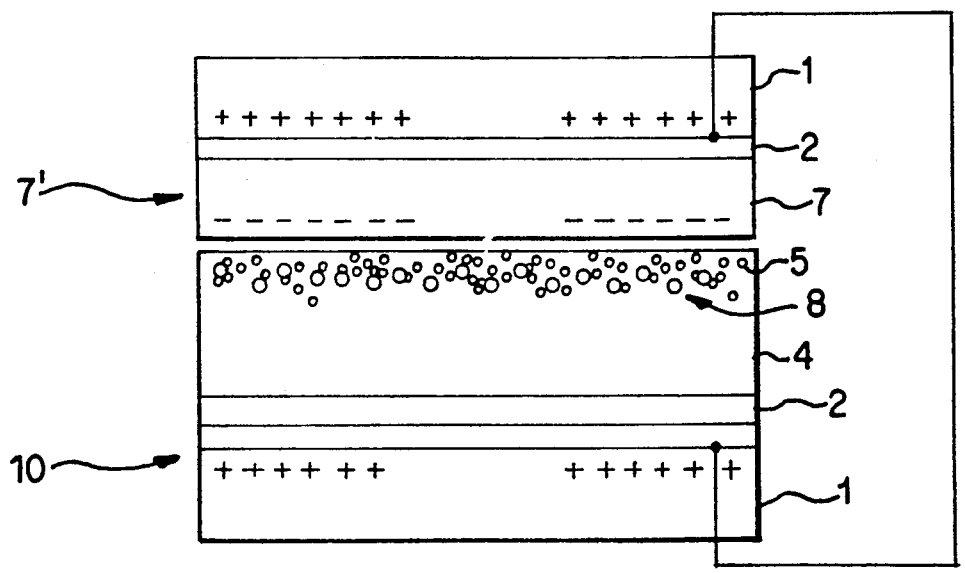
FIG. 23 is a view showing an electrostatic charging step in an image-forming method using the image holding member of the present invention containing a mixture of electrically conductive particles and insulating particles.
Figure 24:
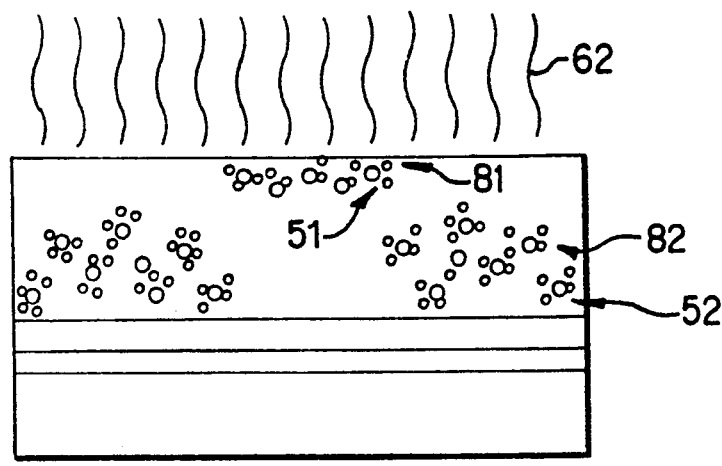
FIG. 24 is a view showing a heating step in an image-forming method using the image holding member of the present invention containing a mixture of an electrically conductive particles and insulating particles.
Figure 25:
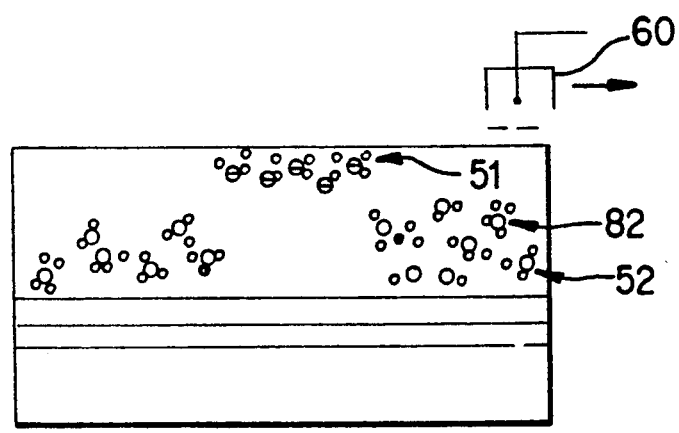
FIG. 25 is a schematic view showing an electrophotographic method using the image holding member of the present invention containing a mixture of electrically conductive particles and insulating particles.

FIG. 23 to FIG. 25 are schematic views explaining the image-forming method.

First, as shown in FIG. 23, an image holding member 10 is brought into contact with a photoreceptor 7' having previously formed latent images (i.e., the photoreceptor was previously charged and imagewise exposed) to transfer the latent images to the image holding member.

As the photoreceptor, ordinary electrophotographic photoreceptors such as organic photoreceptors, selenium photoreceptors, amorphous silicon photoreceptors, etc., suitable for the exposure wavelength being used can be selectively used. In addition, in FIG. 23, the photoreceptor 7' is composed of a substrate 1, an electrically conductive layer 2 (which is unnecessary if the substrate is electrically conductive), and a photosensitive layer 7.

At the transfer of the latent images, the electrically conductive layers of both elements are electrically connected to each other. The application of a proper amount of voltage to the electrically conductive layer of the photoreceptor is effective for controlling the transfer potential. When a negative charge is transferred to the surface of the image holding member, the electrically conductive particles having electron positive hole pairs at normal temperature immediately release the positive holes to the negative charge on the surface to neutralize the surface charge through the charge transporting material. Also, a negative charge remains in the inside of the conductive particles. The electrically conductive particles at the portions to which the negative charge was not transferred have no charge. When the electrically conductive particles 5 have negative charge, the insulting particles 8 existing at the same portion as the conductive particles are polarized and attracted to the conductive particles.

Then the image holding member is heated by heat energy 62, the charged particles, i.e., both the charged conductive particles and insulating particles migrate toward the electrically conductive layer by electrostatic attraction. In this case, if the particle sizes of the insulating particles are from 0.2. $\mu$m to 0.4 $\mu$m, the particles migrate very smoothly and thus the electrically conductive particles migrate very smoothly with the insulating particles, whereby the image holding member is separated into the portions wherein the migrated particles 52 and 82 exist and the portions wherein the particles 51 and 81 remaining in their original position. When the image holding member is cooled to normal temperature, the heat softening layer becomes solid again to complete recording of latent images.

Also, in the case of forming a subbing layer, there is an advantage that since the light which reached the charge generating layer and passed through the layer is diffusedly reflected at the surface of the subbing layer and in the subbing layer and becomes diffused light 63 as shown in FIG. 19, even when a coherent light is applied, an interference action by normally reflected light does not occur.

Then, an electrophotographic method of obtaining copies using the image holding member having the image information stored as described above is explained.

Figure 21:
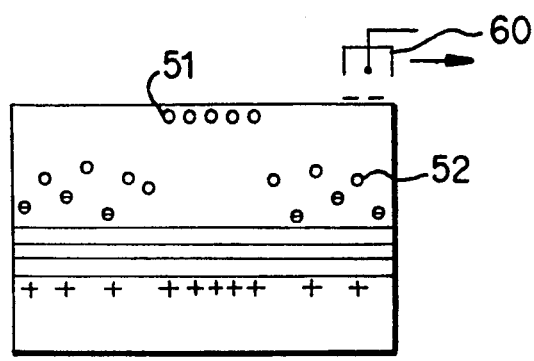
FIG. 21 is a schematic view showing an electrophotographic method using the image holding member of the present invention having formed therein a subbing layer.

As shown in FIGS. 5, 21, and 25, the whole surface of the image holding member having the stored image information is negatively charged, whereby in the portion wherein non-migrated electrically conductive particles (non-migrated particles 51), a negative charge remains in the electrically conductive particles as shown in Figs, 2, 18, and 23 and the surface potential of the image holding member becomes from about 85% to 95% of the case of not existing the electrically conductive particles. On the other hand, in the portions wherein the migrated electrically conductive particles (migrated particles 52) exist, a positive charge is successively injected to the conductive particles from the particles nearer the electrode to neutralize the negative charge at the surface side, whereby the surface potential becomes very low as from 0 to 20% of the case of not existing the electrically conductive particles. Accordingly, by uniform overall negative charging only, a latent image having an electrostatic contrast in conformity with the image is formed. In this case, when insulating particles exist together with the electrically conductive particles, the insulating particles have no relation with the injection of electrostatic charges.

By developing the electrostatic latent image thus formed with an electrophotographic developer, the image can be visualized. In this case, when a high potential portion is visualized, a positive image development is applied, while when a low potential portion is visualized, a negative image reversal development is applied. The selection of a positive image or a negative image may be made by selecting a system of obtaining a desired image according to the image exposing system of the photoreceptor being used. In addition, in the case of exposing with a digital-modulated laser light, a positive image and a negative image can be electronically controlled. Then, by transferring the toner image obtained by the development onto a transfer paper according to an ordinary method, a copy can be obtained.

Thereafter, by electrostatically charging the image holding member again, a latent image can be formed as shown in FIGS. 5, 21, and 25 and hence copying can be successively carried out repeatedly many times without need of an additional image exposure.

In addition, after copying, if necessary, cleaning can be carried out. After finishing a series of the steps, the image holding member used is replaced with a fresh image holding member.

As described above, since the image holding member of the present invention has the foregoing construction, by suitably selecting a charge generating material, wide varieties of exposure light sources can be used. Also, an optional light source such as a light emitting diode, a liquid crystal shutter module, etc., can be utilized.

Also, the image holding member of the present invention can successively copy many copies with one image exposure. Accordingly, in the image holding method and the electrophotographic method of the present invention, the copying step is very simple, copying can be successively carried out at a high speed and, for example, more than 100 copies can be obtained at a high speed for one minute.

Also, by selecting a charge generating material at the production of an image holding member, the image holding member which can be applied to wide varieties of light sources can be produced. For example, an image holding member which can be used for a diode laser emitting a laser light having a wavelength of 780 nm can be produced.

Furthermore, since for the preparation of the image holding member, inexpensive materials can be widely selected, a more inexpensive image holding member can be provided according to the present invention.

The following examples are intended to illustrate the present invention more practically but not to limit it in any way.

EXAMPLE 1

As a substrate, a polyester film of 50 μm in thickness having an electrically conductive layer formed by vapor-depositing aluminum on the surface of the substrate was used. After mixing 8 parts by weight of a solution prepared by previously dissolving 1 part by weight of a polyvinyl butyral resin (S-LEC BM-1, trade name, made by Sekisui Chemical Co., Ltd.) in 19 parts by weight of cyclohexanone with 1.6 parts by weight of X-type phthalocyanine and 12.8 parts by weight of cyclohexanone, the mixture was subjected to a dispersion treatment for about one hour by means of a paint shaker using glass beads having a diameter of about 2 mm as a dispersion medium. The dispersion obtained was coated on the electrically conductive layer with a wire bar and dried for 10 minutes at 100° C. to form a charge generating layer having a thickness of 0.3 μm.

On the other hand, a terpolymer having a weight average molecular weight of about 8,000 was synthesized using 62 parts by weight of styrene, 36 parts by weight of ethyl acrylate, and 2 parts by weight of acrylic acid as the starting material and toluene as a solvent. The glass transition point (Tg) of the polymer was 48° C. and the viscosity thereof at 110° C. was 28,000 poises. Then, 78 parts by weight of the polymer and 22 parts by weight of N,N'-diphenyl-N,N'-bis(3-methylphenyl)-[1,1'-biphenyl]-4,4'diamine were dissolved in 500 parts by weight of toluene. The solution thus obtained was coated on the foregoing charge generating layer with a wire bar and dried for 15 minutes at 110° C. to form a heat softening layer having a thickness of 8μm. The heat softening layer had also a function as a charge transporting layer and when the spectron sensitivity was measured, the result shown by curve A in FIG. 8 was obtained. Thus, it was confirmed that the layer had a sufficient practical sensitivity to the region of a wavelength of 780 nm.

Then, the film was cut into a size of 220 mm × 300 mm and $In_2O_3$ was vapor-deposited thereon under a pressure of $10^{-1}$ Torr. In this case, the film was stuck to a stainless steel plate and the whole surface was heated to 110° C. By controlling the vapor deposition time to a short time, the $In_2O_3$ particles having particle sizes of about 0.4 μm were formed in the state of being embedded in the surface of the heat softening layer. The image holding member formed had the cross-sectional structure as shown in FIG. 1.

The image holding member formed was negatively charged under the condition that the charged potential became −800 volts, whereby the negative charge transported to the $In_2O_3$ particles and the surface potential became −750 volts (FIG. 2).

Then, an image exposure was applied thereto using a diode laser at an intensity of 12 ergs/cm² (FIG. 3). In this case, while transporting the film through a roller having a diameter of 25 mm, the film was irradiated with the laser light at the bent portion, thereby the formation of a striped pattern by the interference of the laser light was prevented (see, JP-A-1-281475). Thereafter, the film was subjected to an overheating treatment by passing the film through the heat roll kept at 115° C. in the dark such that the heating time became 5 seconds, whereby the $In_2O_3$ particles in the unexposed portions migrated to the substrate side (FIG. 4).

As described above, the storage of an image information by writing of the image was finished.

The image holding member having the stored image information thus obtained was wound round an aluminum pipe having a diameter of 108 mm and a length of 340 mm and the pipe was mounted on an electrophotographic copying apparatus of practicing the steps of electrostatically charging at −800 volts, developing with a two-component positively charged developer, transferring to a transfer paper of A4 (210 mm×297 mm), and brush cleaning. Then, as shown in FIG. 5, the image holding member was electrostatically charged with a charging device 60 to form a latent image composed of the portions containing the migrated particles 52 and having a surface potential of −100 volts and the portions containing the unmigrated particles 51 and having a surface potential of −750 volts. By developing the latent image with a two-component positively charged developer and transferring the developed image onto a transfer paper, a copied image having a high contrast was obtained. The foregoing steps were repeatedly practiced at a speed of 100 sheets (copies) per minute. As the result thereof, it was confirmed that by successively copying 2,000 copies, no problem occurred.

EXAMPLE 2

A copolymer having a weight-average molecular weight of about 12,000, Tg of 38° C., and the viscosity at 110° C. of 25,000 poises was synthesized using 80 parts by weight of styrene and 20 parts by weight of hydroxy methacrylate as the comonomers. Then, by following the same procedure as in Example 1 except that the copolymer was used as the heat softening resin, an image holding member was prepared.

The image holding member was slightly inferior to the image holding member in Example 1 in the contact strength of the heat softening layer but could similarly form an image and could be used for continuous (successive) copying.

EXAMPLE 3

Figure 6:
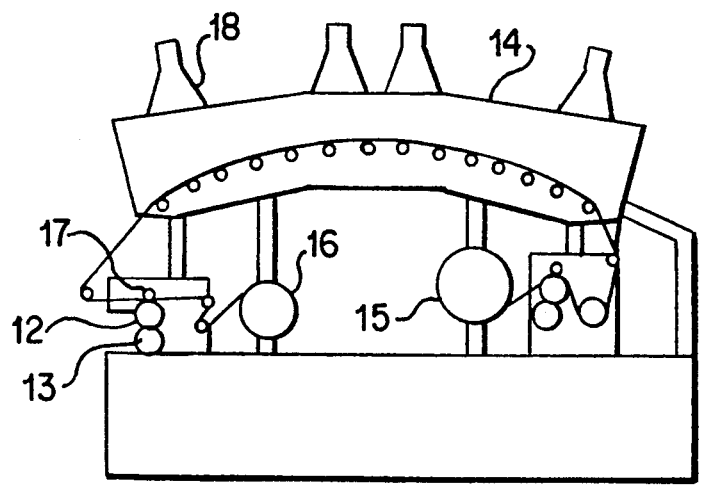
FIG. 6 is a schematic side view of a web coater for producing the image holding member of the present invention.

Coating on a film was continuously carried out using a web coater. FIG. 6 shows a schematic side view of a web coater. A film is supplied from a roll 16, a coating composition is coated on the surface of the film by means of a coating composition-drawing roll 13 and a coating roll 12, and the coated film is dried through a drying zone 14, and wound round a winding roll 15. The numeral 17 shows a push roll and the numeral 18 shows an exhaust duct. The thickness of the coated layer can be controlled by the concentration of the coating composition, the rotation speed of the coating roll, etc.

The substrate as used in Example 1 was coated by the web coater using the same materials as in Example 1 at a speed of 30 cm/second for the charge generating layer and at a speed of 20 cm/second for the heat softening layer to provide a coated film of 100 meters in length.

Then, electrically conductive particles were continuously attached to the film by means of a magnetron sputtering apparatus.

Figure 7:
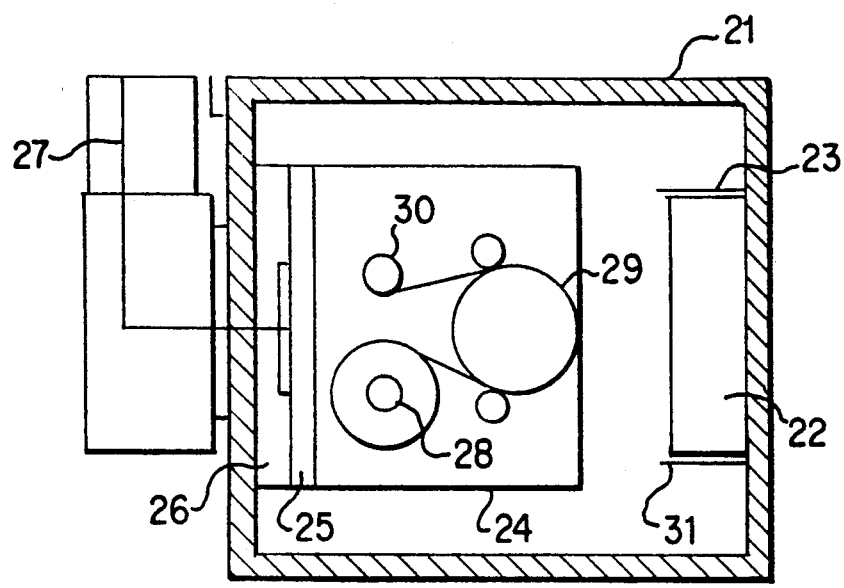
FIG. 7 is a schematic view showing the constitution of a magnetron sputtering apparatus for producing the image holding member of the present invention.

FIG. 7 shows a schematic construction of a magnetron sputtering apparatus. As shown in the FIGURE, in a vacuum container 21 are disposed a magnetron 22 using an indium-tin (10%) alloy as the target and a shield 23 having an annular gas (argon and oxygen) supplying inlet 31 at the tip thereof.

The film is supplied from a roll 28, transported through the surface of a rotary drum 20 kept at 110° C., and wound round a roll 30. On the other hand, around the film are disposed a shield 24 having a slit in front of the target, an aluminum plate 25, and a Teflon (trade name, made by E.I. Du Pont de Nemours & Co., Ltd.) insulator 26, and the aluminum plate 25 is connected to a high frequency circuit through a cooled high-frequency wave passageway 27.

While transporting the film at a speed of 5 cm/second, particles (particle sizes of about 0.3 μm) of indiumtin oxide (ITO) were formed in the vicinity of the surface of the heat softening layer by means of the magnetron sputtering apparatus.

According to the foregoing method, a large amount of image holding members could be prepared. Each of the image holding members could be used as in Example 1.

EXAMPLE 4

By following the same procedure as in Example 1, a charge generating layer and a heat softening layer were formed. Particles of ITO were prepared, 1 part by weight of the particles were mixed with 60 parts of a coating composition for forming a heat softening layer as in Example 1, and then the particles were dispersed by means of a paint shaker. The particle sizes of the ITO particles after dispersion were about 0.2 μm. The dispersion was quickly coated on the heat softening layer at a dry thickness of 0.5 μm with a wire bar and dried for 10 minutes at 110° C. to provide an image holding member. The image holding member obtained also could be used as in Example 1.

EXAMPLE 5

A polyester film of 50 μm in thickness having an electrically conductive layer formed by vapor depositing aluminum was used as a substrate.

After dissolving 5 parts by weight of polyvinyl alcohol (POVAL H, trade name, made by Kuraray Co., Ltd.) in 95 parts by weight of warm water, 12 parts by weight of anatase-type titanium oxide (A110, trade name, made by Sakai Chemical Industry Co., Ltd.) was dispersed in the solution using a stirrer and ultraviolet waves. The dispersion obtained was coated on the substrate with a wire bar and dried for 10 minutes at 100° C. to form a subbing layer having a thickness of 1.5 μm. In addition, the subbing layer was known as an interlayer for improving a whiteness but in the present invention, the layer was used as a light-scattering layer for preventing the occurrence of interference. By controlling the dispersion extent, the subbing layer having a surface roughness of 0.18 μm as Ra and 1.0 μm as Rmax could be obtained. Also, the volume resistivity $\rho$ was $2 \times 10^{13}$ $\Omega$·cm.

Then, 8 parts by weight of a solution prepared by previously dissolving 1 part by weight of a polyvinyl butyral resin (S-LEC BM-1, trade name, made by Sekisui Chemical Co., Ltd.) in 19 parts by weight of cyclohexanone was mixed 1.6 parts by weight of X-type phthalocyanine and 12.8 parts by weight of cyclohexanone and the mixture was subjected to a dispersing treatment for about one hour with a paint shaker using glass beads having a diameter of about 2 mm as the dispersion medium. The dispersion obtained was coated on the subbing layer and dried for 10 minutes at 100° C. to form a charge generating layer having a thickness of 0.3 μm.

Figure 8:
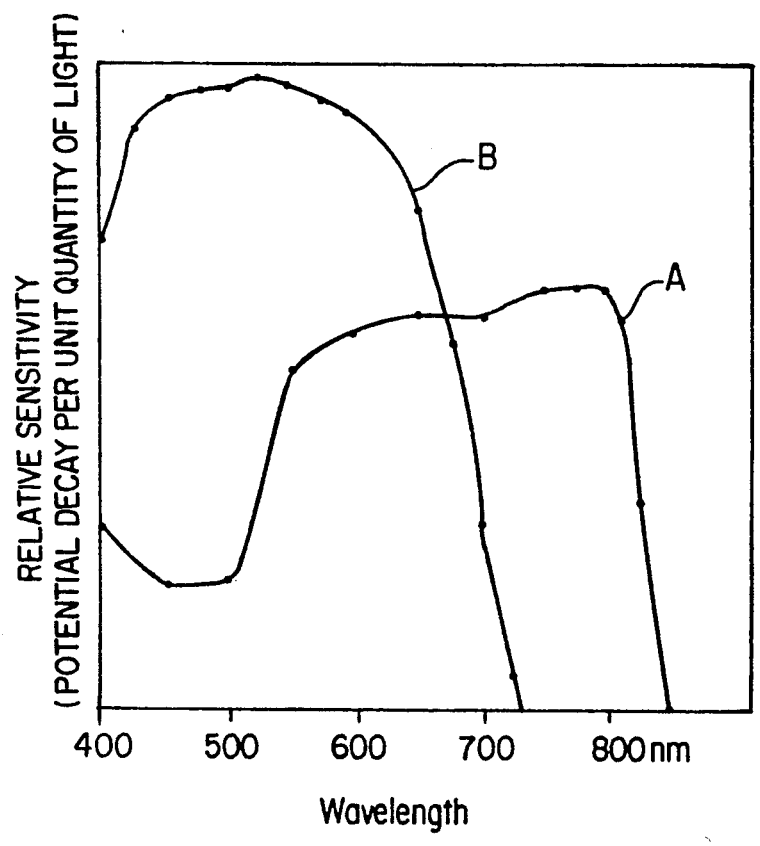
FIG. 8 is a graph showing spectral sensitivity characteristics of photoreceptors.
Figure 9:
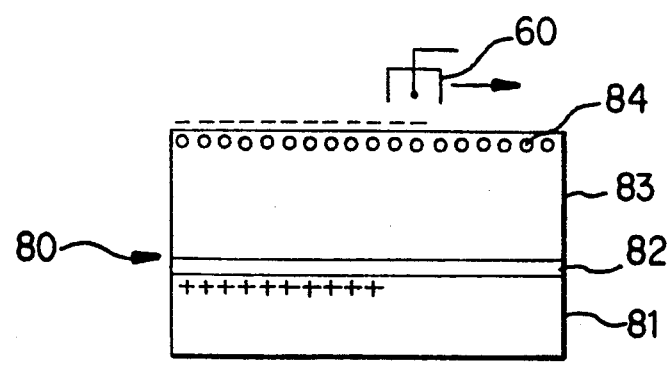
FIG. 9 is a view showing an electrostatic charging step in a conventional image-forming method.
Figure 10:
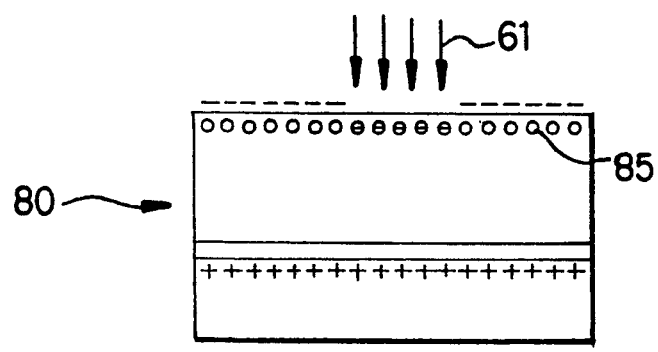
FIG. 10 is a view showing a light exposure step in a conventional image-forming method.
Figure 11:
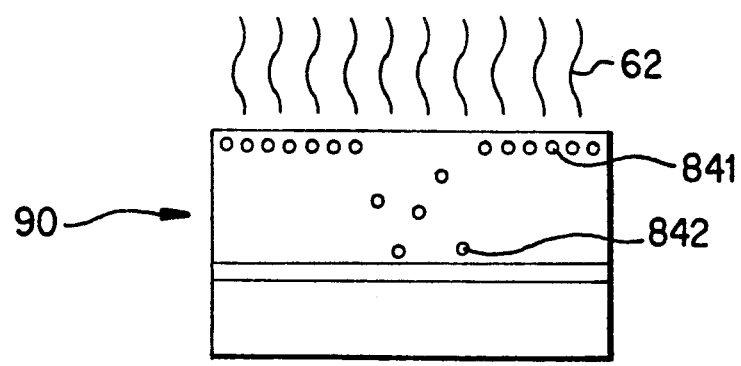
FIG. 11 is a view showing a heating step in a conventional image-forming method.
Figure 12:
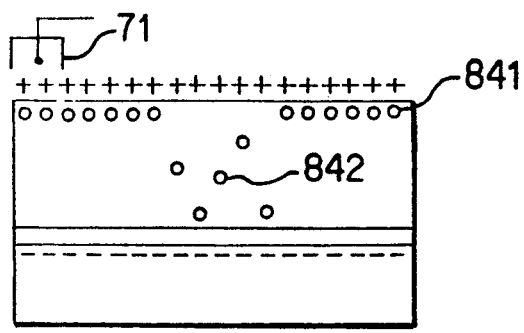
FIG. 12 is a view showing an electrostatic charging step in an electrophotographic method using a conventional image holding member.
Figure 13:
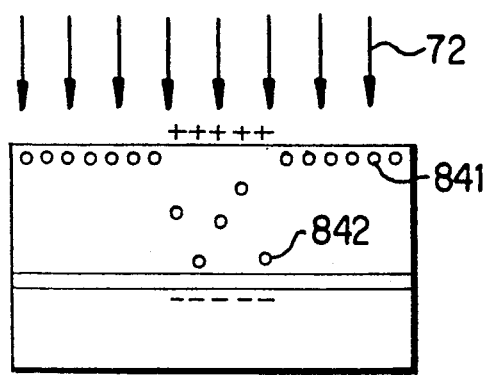
FIG. 13 is a view showing a uniformly light exposing step in an electrophotographic method using the conventional image holding member.
Figure 14:
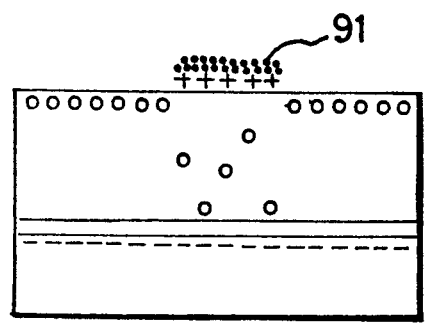
FIG. 14 is a view showing a developing step in an electrophotographic method using the conventional image holding member.
Figure 15:
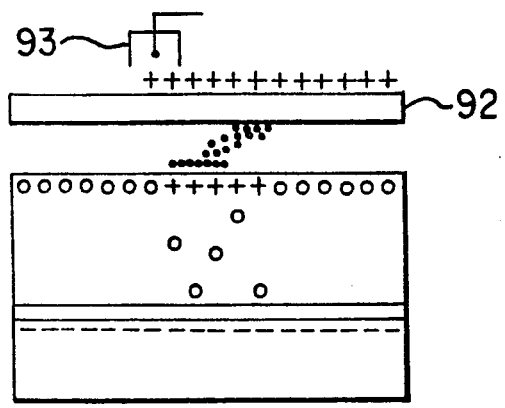
FIG. 15 is a view showing an image transferring step in an electrophotographic method using the conventional image holding member.
Figure 16:
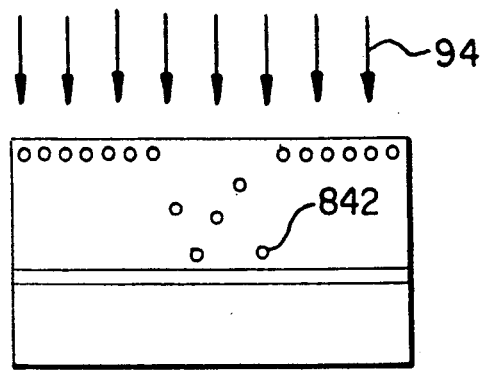
FIG. 16 is a view showing a static eliminating light exposing step in an electrophotographic method using the conventional image holding member.

On the other hand, a terpolymer having a weight-average molecular weight of about 8,000 was synthesized using 62 parts by weight of styrene, 36 parts by weight of ethyl acrylate, and 2 parts by weight of acrylic acid as the starting materials and toluene as a solvent. Also, Tg of the terpolymer obtained was 48° C. and the viscosity thereof at 110° C. was 28,000 poises. Then, 78 parts by weight of the polymer and 22 parts by weight of N,N'-diphenyl-N,N'-bis(3-methylphenyl)-[1,1'-biphenyl]-4,4'-diamine were dissolved in 500 parts by weight of toluene. The solution obtained was coated on the foregoing charge generating layer with a wire bar and dried for 15 minutes at 110° C. to form a heat softening layer having a thickness of 8 μm. The heat softening layer also had a function as a charge transporting layer and the spectral sensitivity thereof measured was as shown in FIG. 8 as curve A, which confirmed that the layer had a sufficient practical sensitivity to the region of a wavelength of 780 nm.

Then, the film thus obtained was cut into a size of 220 mm × 300 mm and In$_2$O$_3$ was vapor-deposited thereon under a pressure of $10^{-1}$ Torr. In this case, the film was stuck to a stainless steel plate and the whole surface thereof was heated to 110° C. By controlling the vapor depositing time to a short time, In$_2$O$_3$ particles having the particle sizes of about 0.4 μm were formed in a state of being embedded in the surface of the heat softening layer.

Figure 17:
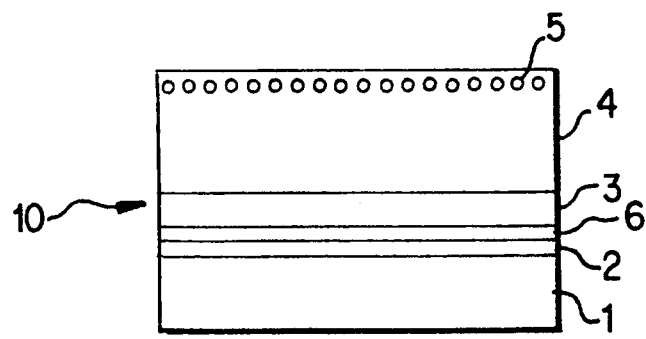
FIG. 17 is a schematic cross-sectional view of one embodiment of the image holding member of the present invention having formed therein a subbing layer.

The image holding member formed had the cross-sectional structure shown in FIG. 17.

The image holding member was negatively charged under a condition that the surface potential became −800 volts, whereby the negative charge transported to the $In_2O_3$ particles and the surface potential became −750 volts (FIG. 18). Then, the image holding member was image-exposed using a diode laser at an intensity of 12 ergs/cm² (FIG. 19).

Thereafter, the film was subjected to an overheating treatment by passing the film through the upper surface of a heat roll kept at 115° C. in the dark such that the heating time became 5 seconds, whereby the $In_2O_3$ particles in the unexposed portions migrated to the substrate side (FIG. 20).

Thus, the storage by writing of images was finished.

The image holding member having the image information stored was wound round an aluminum pipe having a diameter of 108 mm and a length of 340 mm and mounted on an electrophotographic copying apparatus of practicing the steps of electrostatically charging at −800 volts, developing with a two-component positively charged developer, transferring to a transfer paper of A4, and brush cleaning. Then, as shown in FIG. 21, the image holding member was charged with a charging device 60 to form a latent image having the portions containing the migrated particles 52 and having the surface potential of −100 volts and the portions containing the unmigrated particles 51 and having a surface potential of −750 volts. The latent image was developed with the two-component positively charged developer and the developed image was transferred onto the transfer paper to provide a copied image having a high contrast.

The steps were repeatedly practiced at a speed of 100 copies per minute. As the results thereof, it was confirmed that by successively copying 2,000 copies, no problem occurred.

REFERENCE EXAMPLE 1

When the dispersion of the coating composition for a subbing layer was insufficient, the surface roughness of the subbing layer formed by coating the coating composition was 0.3 μm as Ra and 2.1 μm as Rmax. In this case, the image quality of the images became rough and, in particular, in the case of a solid white image, many fine black points formed.

REFERENCE EXAMPLE 2

A subbing layer was formed using polyvinyl alcohol only without dispersing therein titanium oxide. When the thickness of the subbing layer was same as that in Example 5, the volume resistivity $\rho$ was $4 \times 10^{14}$ Ω·cm. In the images formed in this case, striped patterns formed and, further, there was a problem that the occurrence of fog increased gradually.

EXAMPLE 6

In a mixture of 40 parts by weight of methanol and 60 parts by weight of butanol was dissolved 5 parts by weight of copolymerized nylon (CM 8000, trade name, made by Toray Industries, Inc.). In the solution obtained was dispersed 15 parts by weight of anatase-type titanium oxide (TIPAQUE W-10, trade name, made by Ishihara Sangyo Kaisha, Ltd.) in a ball mill. The dispersion obtained was coated on a substrate with a wire bar and dried for 10 minutes at 100° C. to form a subbing layer having a thickness of 2 μm. The layer was formed for a different purpose from a conventional purpose of improving the reflectivity. The surface roughness of the subbing layer could be changed according to the kind of the resin being used, the mixing ratio of powders, and the dispersing degree of the powders and in the aforesaid case, the surface roughness was 0.16 μm as Ra and 1.0 μm as Rmax and also the volume resistivity $\rho$ was $4 \times 10^{10}$ Ω·cm.

In the case of forming the subbing layer as described above, an image holding member giving good results could be produced.

EXAMPLE 7

To the coating composition for the subbing layer in Example 6 was further added 0.4 part by weight of a polyvinylidene fluoride powder (KYNAR 461, trade name, made by Pennwalt Co.) and the mixture was dispersed in a sand mill using glass beads having a diameter of 1 mm. A subbing layer was formed by coating the dispersion on a substrate. The surface roughness of the subbing layer measured was 0.15 μm as Ra and 1.0 μm as Rmax. In this case, the surface of the subbing layer was roughened with the polyvinylidene fluoride powder and when the dispersing degree was changed, the surface roughness was not largely changed and hence a stable dispersing operation could be made.

In the case of forming the subbing layer as described above, an image holding member giving good results could be produced.

EXAMPLE 8

Coating on a film substrate was continuously carried out using a web coater as shown in FIG. 6 described hereinbefore. Using the same substrate and materials as in Example 5, coating was carried out by means of the web coater at the speeds of 40 cm/second for the subbing layer, 30 cm/second for the charge generating layer, and 20 cm/second for the heat softening layer to provide a coated film having a length of 100 meters.

Then, electrically conductive particles were continuously attached to the film using the magnetron sputtering apparatus shown in FIG. 7.

That is, while transporting the film at a speed of 5 cm/second, ITO particles (particle sizes of about 0.3 μm) were formed in the vicinity of the surface of the heat softening layer using the magnetron sputtering apparatus. According to the method, a large amount of image holding members could be produced. Each of the image holding members obtained could be used as in Example 5.

EXAMPLE 9

A polyester film of 50 μm in thickness having an electrically conductive layer formed by vapor-depositing aluminum was used as a substrate.

After mixing 8 parts by weight of a solution obtained by previously dissolving 1 part by weight of a polyvinyl butyral resin (S-LEC BM-1, trade name, made by Sekisui Chemical Co., Ltd.) in 19 parts by weight of cyclohexanone with 1.6 parts by weight of X-type non-metal phthalocyanine and 12.8 parts by weight of cyclohexanone, the mixture was dispersed for about one hour with a paint shaker using glass beads having a diameter of about 2 mm as the dispersion medium.

The dispersion obtained was coated on the foregoing electrically conductive layer of the polyester film with a wire bar and dried for 10 minutes at 100° C. to form a charge generating layer having a thickness of 0.3 μm.

On the other hand, a terpolymer having a weight-average molecular weight of about 8,000 was synthesized using 62 parts by weight of styrene, 36 parts by weight of ethyl acrylate, and 2 parts by weight of acrylic acid as the starting materials and toluene as a solvent. The Tg of the polymer was 48° C. and the viscosity thereof at 110° C. was 28,000 poises.

Then, 78 parts by weight of the foregoing polymer and 22 parts by weight of a charge transporting material, N,N'-diphenyl-N,N'-bis(3-methylphenyl)-1,1'-biphenyl]-4,4'-diamine were dissolved in 500 parts by weight of toluene. The solution obtained was coated on the foregoing charge generating layer with a wire bar and dried for 15 minutes at 110° C. to form a heat softening layer having a thickness of 8 μm. The heat softening layer had also a function as a charge transporting layer and the spectral sensitivity thereof measured was shown in FIG. 8 as curve A. From the result, it was confirmed that the heat softening layer had a sufficient practical sensitivity to the region of a wavelength of 780 nm.

Then, a mixture of 1 part by weight of an indium oxide-tin oxide (ITO) powder, 6 parts by weight of the foregoing terpolymer, 2 parts by weight of the foregoing charge generating material, 50 parts by weight of toluene, and 50 parts by weight of butanol was treated by a ball mill to provide a dispersion. The average particle size of the particles after dispersion was 0.35 μm. The dispersion was coated on the heat softening layer with a wire bar at a dry thickness of 0.6 μm.

The image holding member thus formed had the cross-sectional structure shown in FIG. 26.

The image holding member was negatively charged under the condition that the surface potential became −800 volts, whereby the negative charge transported to the ITO particles and the surface potential became −750 volts (FIG. 2).

Then, image holding member was image-exposed using a diode laser at an intensity of 12 ergs/cm² (FIG. 3). In this case, while transporting the film (the image holding member) through the upper surface of a roller having a diameter of 25 mm, the film was irradiated by the laser light at the bent portion, whereby the occurrence of striped patterns on the images by the interference of the laser light was prevented. (See, JP-A-1-281475).

Thereafter, the film was subjected to an overheating treatment by passing the film through the upper surface of a heat roll kept at 115° C. such that the heating time became 5 seconds, whereby the ITO particles at the unexposed portions migrated to the substrate side (FIG. 4).

By the manner as described above, the storage of an image by writing of the image was finished.

The image holding member having the image information stored was wound round an aluminum pipe having a diameter of 108 mm and a length of 340 mm and mounted on an electrophotographic apparatus for practicing the steps of charging at −800 volts, developing with a two-component positively charged developer, transferring to a transfer paper of A4, and brush cleaning. As shown in FIG. 5, the image holding member was charged with a charging device 60 to form a latent image having the portions containing the migrated particles 52 and having a surface potential of −20 volts and the portions containing the unmigrated particles 51 and having a surface potential of −750 volts. By developing the latent image with a two-component positively charged developer and transferring the developed image onto a transfer paper, a copied image having a high contrast was obtained.

These steps were repeatedly practiced at a speed of 100 copies per minute. By the result, it was confirmed that by successively copying 2,000 copies, there occurred no problem.

EXAMPLE 10

By following the same procedure as Example 9 except that a tin oxide-antimony oxide ($SnO_2$-$Sb_2O_3$) powder was used in place of the ITO powder, an image holding member was produced. In addition, the average particle size of the particles after dispersing the powder was 0.28 μm.

EXAMPLE 11

By following the same procedure as Example 9 except that the perylene pigment having the structural formula shown below was used in place of the X-type non-metal phthalocyanine used in Example 9 as the charge generating material, an image holding material was produced.

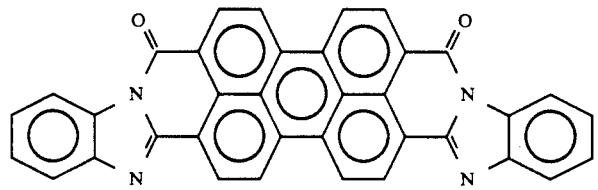

When the image holding member was treated as in Example 9 except that the image holding member was image exposed using a diode laser having a diode laser emitting light having a wavelength of 680 nm, high-speed copying could be carried out.

EXAMPLE 12

Coating on a film was continuously carried out using a web coater shown in FIG. 6.

That is, using the same substrate and materials as in Example 9, the film (substrate) was coated by means of the web coater at the speeds of 30 cm/second for a charge generating layer, 20 cm/second for a heat softening layer, and 40 cm/second for an electrically conductive particle-dispersed layer to provide a coated film (image holding member) having a length of 100 meters.

By the aforesaid method, a large amount of image holding members could be produced. Also, each of the image holding members could be used as in the case of Example 9.

As another embodiment, a charge generating layer and a heat softening layer were formed on a substrate as in Example 9.

Then, 1 part by weight of the ITO particles were added to a mixed solvent composed of 20 parts by weight of toluene and 40 parts by weight of methylene chloride and the mixture was subjected to a dispersing treatment by means of a ball mill. In this case, 0.05 part by weight of a silane coupling agent (A1100, trade name, made by Nippon Unicar K.K.) was added to the dispersion for improving the dispersibility. The average particle size of the ITO particles after dispersion was 0.25 μm.

The dispersion obtained was coated on the heat softening layer with a wire bar and after air-drying for 3 seconds and allowing to stand for 20 seconds, the coated layer was dried for 10 minutes at 100° C. Since methylene chloride used as the solvent had a strong dissolving property for the heat softening layer, the surface of the heat softening layer was in a dissolved state in a short period of time and the ITO particles entered the vicinity of the surface of the heat softening layer but since the evaporation speed of methylene chloride was very high, the aforesaid state was only about 3 seconds. Accordingly, the ITO particles did not enter the central portion in the inside of the heat softening layer and were in a state of being embedded in the vicinity of the surface of the heat softening layer. The image holding member obtained could also be used as in Example 9.

EXAMPLE 13

A polyester film of 50 μm in thickness having an electrically conductive layer formed by vapor-depositing aluminum onto the surface was used as a substrate.

On the other hand, a terpolymer having a weight-average molecular weight of about 8,000 was synthesized using 62 parts by weight of styrene, 36 parts by weight of ethyl acrylate, and 2 parts by weight of acrylic acid as the starting material and toluene as a solvent. The Tg of the polymer was 48° C. and the viscosity thereof at 110° C. was 28,000 poises. Then, 78 parts by weight of the polymer and 22 parts by weight of N,N'-diphenyl-N,N'-bis(3-methylphenyl)-[1,1'-biphenyl]-4,4'-diamine were dissolved in 500 parts by weight of toluene. The solution was coated on the electrically conductive layer with a wire bar and dried far 15 minutes at 110° C. to form a heat softening layer having a thickness of 8 μm.

Then, 1 part by weight of ITO particles (particle sizes of 0.1 μm, made by Mitsubishi Material K.K.) and 2 parts by weight of an anatase-type titanium oxide powder (A110, trade name, made by Sakai Chemical Industry Co., Ltd., average particle size 0.3 μm) were mixed with a solution composed of 8 parts by weight of the foregoing terpolymer, 2 parts by weight of the foregoing charge transporting material, and 100 parts by weight of toluene and the mixture was dispersed in a ball mill. The dispersion was coated on the heat softening layer with a wire bar at a dry thickness of 0.6 μm and dried for 5 minutes at 110° C. to provide an image holding member. The image holding member had the cross-sectional structure as shown in FIG. 1.

Figure 29:
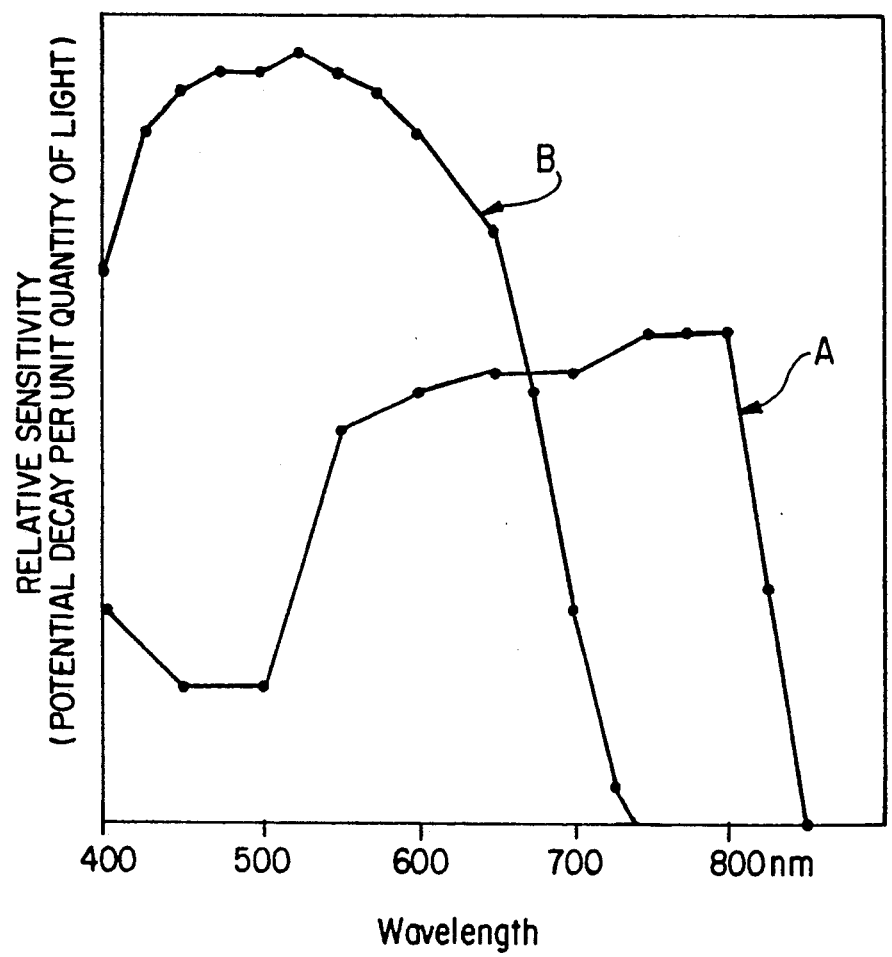
FIG. 29 is a graph showing the spectral sensitivity characteristics of photoreceptors.

Apart from this, an electrophotographic photoreceptor having a charge generating layer containing X-type phthalocyanine and a charge transporting layer formed thereon was prepared (as described, e.g., JP-A-63-271355). The spectral sensitivity thereof measured was shown in FIG. 29 as curve A, which confirmed that the photoreceptor had a sufficient practical sensitivity to the region of a wavelength of 780 nm.

The electrophotographic photoreceptor was charged at −700 volts and thereafter exposed using a diode laser such that the photoreceptor was irradiated with the light in conformity of a character portion to form a latent image. The surface potential of the exposed portions became −100 volts. Then, the photoreceptor was brought into contact with the image holding member so that the charge transporting layer of the photoreceptor was opposed to the heat softening layer of the image folding member to transfer the latent image, wherein a voltage of ±100 volts was applied to the substrate of the photoreceptor. The surface potential of the foregoing image holding member was −500 volts at the portions corresponding to the unexposed portions of the photoreceptor side and was zero at the portions corresponding to the exposed portions of the photoreceptor side.

Thereafter, the image holding member was heated by passing the film through the upper surface of a heat roll kept at 115° C. such that the heating time became 5 seconds, whereby the particles in the portions where the charge remained migrated to the substrate side (FIG. 24).

As described above, the storage by writing of images was finished.

The image holding member having the image information stored was wound round an aluminum pipe having a diameter of 108 mm and a length of 340 mm and mounted on an electrophotographic copying apparatus of practicing the steps of charging at −800 volts, developing with a two-component positively charged developer, transferring to a transfer paper of A4, and brush cleaning. Then, as shown in FIG. 25, the image holding member was charged with a charging device 60 to form a latent image having the portions containing the migrated particles 52 and having a surface potential of −100 volts and the portions containing the unmigrated particles 51 and having a surface potential of −750 volts. By developing the latent image with a two-component positively charged developer and transferring the developed image onto a transfer paper, a copied image having a high contrast was obtained.

These steps were repeatedly practiced at a speed of 100 sheets (copies) per minute. As the result thereof, it was confirmed that by successively copying 2,000 copies, no problem occurred.

EXAMPLE 14

By following the same procedure as Example 13 except that a copolymer having a weight-average molecular weight of about 12,000, the Tg of about 38° C., and a viscosity at 110° C. of 25,000 poises synthesized using 80 parts by weight of styrene and 20 parts by weight of hydroxy methacrylate as the comonomers was used as the heat softening resin, an image holding member was prepared.

The image holding member was slightly infe ior to the case of Example 13 in the contact strength of the heat softening layer but could form images as in Example 13 and also could be used for successive copying.

EXAMPLE 15

In Example 14, a subbing layer having a thickness of 0.5 μm composed of a copolymerized nylon resin (CM8000, trade name, made by Toray Industries, Inc.) was formed on the electrically conductive layer of the substrate before coating the heat softening layer. By forming the subbing layer, the contact strength of the heat softening layer could be improved.

EXAMPLE 16

Then, an example of producing an image holding member having a charge generating layer by means of a web coater is shown.

First, 3 parts by weight of a polyvinyl butyral resin (S-LEC BM-1, trade name, made by Sekisui Chemical Co., Ltd.) was dissolved in 100 parts by weight of cyclohexanone and then after mixing therewith 6 parts of X-type non-metal phthalo-cyanine, the mixture was dispersed for 6 hours with a sand mill dispersing apparatus using glass beads having a diameter of 1 mm as the dispersing medium and 2-butanone was added to the dispersion to provide a coating composition for a charge generating layer having a concentration of 3.5%.

Using the same substrate and materials as in Example 15, the substrate was coated with a web coater at the speeds of 40 cm/second for the subbing layer, 30 cm/second of the charge generating layer, and 20 cm/second for the heat softening layer to provide a coated film having a length of 110 meters. In this case, the thickness of the charge generating layer was 0.25 $\mu$m.

As in Example 13, 1 part by weight of an indium oxide powder (made by Sumitomo Metal Mining Co., Ltd., particle size 0.1 $\mu$m) and 2 parts by weight of a silicone resin powder (TOSPEARL 103, trade name, made by Toshiba Silicone K.K., average particle size 0.3 $\mu$m) were mixed with a solution (composed of 8 parts by weight of the terpolymer, 2 parts by weight of the charge transporting material, and 100 parts by weight of toluene, and then the mixture was dispersed by means of a sand mill dispersing apparatus to provide a coating composition. The coating composition was coated on the heat softening layer by the foregoing web coater at a speed of 40 cm/second and dried to form a powder-containing layer having a thickness of 0.5 $\mu$m.

The image holding member was cut into a sheet of 220 mm $\times$ 300 mm and uniformly charged at $-750$ volts.

Then, the image holding member was image-exposed using a diode laser at an intensity of 12 ergs/cm$^2$.

In this case, while transporting the film (image holding member) on a roller having a diameter of 25 mm, the film was irradiated with the laser light at the bent portion, whereby the occurrence of striped patterns on the images by the interference of the laser light was prevented (see, JP-A-1-281475). Thereafter, the film was subjected to a heat treatment by passing the film through the upper surface of a heat roll kept at 115° C. such that the heating time became 5 second, whereby the particles in the unexposed portions migrated to the substrate side.

As described above, the storage by writing images was finished.

The image holding member having the image information stored was wound round an aluminum pipe having a diameter of 108 mm and a length of 340 mm, mounted on an electrophotographic copying apparatus of practicing the steps of charging at $-800$ volts, developing with a two-component positively charged developer, transferring onto a transfer paper of A4, and brush cleaning, and copying was carried out at a speed of 100 copies per minute. By successively copying 2,000 copies, no problem occurred.

While the invention has been described in detail and with reference to specific examples thereof, it will be apparent to one skilled in the art that various changes and modifications can be made therein without departing from the spirit and scope thereof.

What is claimed is:

1. An image holding member comprising:
   a substrate having an electrically conductive surface,
   a charge generating layer formed on said electrically conductive substrate, and
   a heat softening layer formed on said charge generating layer and containing a charge transporting material, electrically conductive particles, and a heat softening resin,
   wherein substantially all of said electrically conductive particles are disposed inside the heat softening layer in the vicinity of the surface thereof.

2. The image holding member as claimed in claim 1, wherein the electrically conductive particles are electrically conductive metal oxide particles.

3. The image holding member as claimed in claim 1, wherein a reflection preventing functional region is formed between the substrate having said electrically conductive surface and said charge generating layer.

4. The image holding member as claimed in claim 3, wherein the reflection preventing functional region is composed of a layer of a resin having dispersed therein a powder.

5. An image holding member according to claim 1, wherein substantially all of the electrically conductive particles exist in a region within approximately 2 micrometers of the surface of the heat softening layer.

6. An image holding member according to claim 1, wherein substantially all of the electrically conductive particles exist in a region within 1 micrometer of the surface of the heat softening layer.

* * * * *